2,722,483

METHOD AND COMPOSITION FOR INHIBITING THE GROWTH OF MICROORGANISMS

Joseph Winkler, New York, N. Y., assignor to Fumol Corporation, a corporation of New York No Drawing. Application April 13, 1950, Serial No. 155,776

7 Claims. (Cl. 99—222)

Dehydroacetic acid, which has the structure formula

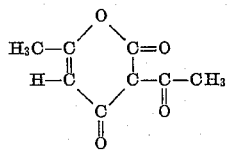

is also known as 3-acetyl-6-methyl pyrandione-2,4 and exists in both a keto and an enolic form. Dehydroacetic acid and its edible sodium, potassium, ammonium and calcium salts are known as non-hazardous preservatives to humans at used concentrations in food and beverages. Up to one tenth of a percent when incorporated into the beverage or foodstuff is almost undetectible by taste or smell. They are essentially neutral compounds and do not affect materially the pH of the foodstuff in which they are employed for protection against microorganism decay.

Table 1 shows concentration of dehydroacetic acid and/or its edible salts which still permit growth, as well as minimum concentrations which inhibit growth of different yeasts, fungi and bacteria. A careful study of table 1, however, brings one to the conclusion that depending upon the species of the microorganism, the minimum concentration of dehydroacetic acid or its salts (having an equal activity), varies in a very wide range; from .005% to .4%—or differs about 80 times. A very high concentration of .3% to .4% is generally required to inhibit growth of bacteria, while on the other hand, for yeasts and fungi a much lower concentration is sufficient. As in beverage and foodstuff spoilage, all classes of microorganisms are taking part, the necessary minimum amount of hydroacetic acid for all possibilities must be held at the highest necessary level i. e. at .4%.

TABLE 1

TESTS MADE WITH 100% DEHYDROACETIC ACID OR ITS EDIBLE SALTS

| Test Organism | Concentration (Percent) Permitting Growth | Concentration (Percent) That Inhibits Growth |
|---|---|---|
| Aerobacter aerogenes | 0.2 | 0.3 |
| Alkaligenes faecalis | 0.3 | 0.4 |
| Aspergillus niger | 0.03 | 0.04 |
| Bacillus cereus | 0.2 | 0.3 |
| Bacillus megatherium | 0.2 | 0.3 |
| Bacillus mesentericus | 0.2 | 0.3 |
| Bacillus subtilis | 0.2 | 0.3 |
| Escherichia coli | 0.3 | 0.4 |
| Lactobacillus planatarium | 0.08 | 0.1 |
| Penicillium digitatum | 0.02 | 0.03 |
| Penicillium expansum | 0.008 | 0.01 |
| Pseudomonas aeruginosa | 0.3 | 0.4 |
| Rhisopus nigricans | 0.04 | 0.05 |
| Saccharomyces cerevisiae | 0.05 | 0.1 |
| Salmonella pullorum | 0.2 | 0.3 |
| Salmonella typhose | 0.1 | 0.2 |
| Staphylococcus aureus | 0.2 | 0.3 |
| Streptococcus pyogenes | 0.2 | 0.3 |
| Trichophyton mentagrophytes | 0.004 | 0.005 |
| Trichophyton interdigitale | 0.001 | 0.005 |

Test period: 7 days for yeast and bacteria, two weeks for fungi.

Such an excessive amount of dehydroacetic acid, however, when added to foodstuff or beverages is sufficient so that it involves some detection of the chemical by taste. Such excessive amount also is not advisable from the economic point of view. Besides this, it may already involve some health hazards in prolonged sytematic consumption of the food preserved with such excessive amount. Because of the high cost of the material it is therefore highly desirable to keep said acid concentration in foodstuffs and beverages not higher than .1%, but at the same time to have proper protection against all kinds of microbial decay.

TABLE 1a

TESTS MADE WITH 100% DEHYDROACETIC ACID IN COMPARISON WITH [1]—

BA—Benzoic acid 100%
SA—Salicylic acid 100%
BHB—n-butylparahydroxybenzoate 100%
DChS—Dimethyldichlorosuccinate 100%
A.—Concentration permitting growth in w. percent
X.—Concentration that inhibits growth in percent

| Test organism | 100% Dehydroacetic Acid | | BA | | SA | | BHB | | DChS | |
|---|---|---|---|---|---|---|---|---|---|---|
| | A. | X. | A. | X. | A. | X. | A. | X. | A. | X. |
| Aspergillus niger | .03 | .05 | .65 | .75 | .50 | .60 | .10 | .15 | .08 | .10 |
| Bacillus mesentericus | .20 | .30 | .50 | .75 | .50 | .60 | .10 | .15 | .08 | .10 |
| Escherichia coli | .30 | .40 | .50 | .75 | .50 | .70 | .10 | .15 | .08 | .10 |
| Lactobacillus plantarium | .08 | .40 | .40 | .50 | .40 | .50 | .10 | .12 | .05 | .07 |
| Penicillium expansum | .008 | .01 | .15 | .25 | .20 | .30 | .10 | .15 | .05 | .06 |
| Penicillium digitatum | .02 | .03 | .40 | .50 | .30 | .40 | .10 | .20 | .05 | .06 |
| Rhisopus nigricans | .04 | .05 | .40 | .50 | .30 | .40 | .08 | .10 | .08 | .10 |
| Saccharomyces cerevisiae | .05 | .10 | .40 | .70 | .30 | .40 | .20 | .30 | .08 | .10 |

[1] Test period: 7 days for yeast and bacteria, two weeks for fungi.

As the result of extensive investigation in preparing compounds which could increase the anti-microbial activity of dehydroacetic acid or its edible salts, I have discovered that two classes of chemicals (which in themselves already possess in various but inferior degrees anti-microbial properties, with respect to dehydroacetic), are surprisingly highly effective synergists for the anti-microbial activity of dehydroacetic acid or its edible salts. Their presence in quantities up to 50% of the total preservative concentration allows keeping the necessary minimum amount of the preservative composed predominantly of dehydroacetic acid or its edible salts, in all cases much lower than it would follow from the additive anti-microbial power alone. See i. e. Table 1a, where the anti-microbial properties of dehydroacetic acid and some of my basic synergists are compared. Also in all cases the necessary minimum amount to give a complete protection to the food against microorganisms is not higher than .1%, or lies below the limits of government regulations for the addition of preservatives to foods and beverages.

I have found two definite classes of chemicals which act to greatly increase the anti-microbial properties of dehydroacetic acid or its edible salts.

One class derives from benzoic acid and comprises; benzoic acid, its edible calcium, potassium, ammonium and sodium salts, its alkyl esters; and ortho- and para-hydroxybenzoic acid and its edible salts and alkyl esters. I give, for example, an incomplete listing of individual compounds, as follows: benzoic acid, sodium benzoate, potassium benzoate, calcium benzoate, ammonium benzoate, ethyl benzoate, salicylic acid, sodium salicylate, calcium salicylate, salicylic acid acetate, salicylic acid ethyl ester, para-hydroxymethylbenzoate, parahydroxyethylbenzoate, parahydroxypropylbenzoate, n-butylparahydroxybenzoate, sodium salt of n-butylparahydroxybenzoate.

The other class is alkyl ($C_1$—$C_4$) derivatives of alpha, beta-dichlor-succinic acid such as for example dimethyldichlorosuccinate, diethyldichlorosuccinate, dipropyldichlorosuccinate, diisopropyldischlorosuccinate, dibutyldichlorosuccinate.

A mixture consisting of up to 50% of dehydroacetic acid or its edible salt and the balance being one or more of the above mentioned activating compounds, has a highly balanced anti-microbial activity, and always in amounts below .1% acts as a universal preservative against all classes of microorganisms. The results obtained with some of the activated compounds are compared with dehydroacetic acid or its edible salts in Table 2. The preservatives are there given with code names from $A_0$ to $A_{13}$, and the quantities are minimum percent concentration (by weight) necessary for inhibiting growth of the specific microorganisms. The compounds listed in Table 2 are composed as follows:

$A_0$ ------ 100% of dehydroacetic acid or its edible salt.
$A_1$ ------ 80% $A_0$ plus 20% benzoic acid.
$A_2$ ------ 70% $A_0$ plus 30% sodium benzoate.
$A_3$ ------ 75% $A_0$ plus 25% calcium benzoate.
$A_4$ ------ 75% $A_0$ plus 25% salicylic acid.
$A_5$ ------ 72% $A_0$ plus 28% sodium salicylate.
$A_6$ ------ 65% $A_0$ plus 35% n-butylparahydroxybenzoate.
$A_7$ ------ 80% $A_0$ plus 20% n-propylparahydroxybenzoate.
$A_8$ ------ 83% $A_0$ plus 17% ethylparahydroxybenzoate.
$A_9$ ------ 70% $A_0$ plus 30% sodiumpropylparahydroxybenzoate.
$A_{10}$ ----- 50% $A_0$ plus 50% dimethyldichlorosuccinate.
$A_{11}$ ----- 55% $A_0$ plus 45% diisopropyldichlorosuccinate.
$A_{12}$ ----- 55% $A_0$ plus 35% diethyldichlorosuccinate plus 10% benzoic acid.
$A_{13}$ ----- 55% $A_0$ plus 35% dimethyldichlorosuccinate plus 10% n-butylparahydroxybenzoate.

TABLE 2

*Minimum quantities in weight per cent inhibiting growth*

(TESTS MADE IN VITRIO AS DONE IN TABLES 1 AND 1a [1])

| Test organism | $A_0$ | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ |
|---|---|---|---|---|---|---|---|---|---|---|---|---|---|---|
| Aerobacter aerotenes | .3 | .1 | .1 | .1 | .09 | .06 | .06 | .06 | .06 | .06 | .05 | .05 | .05 | .05 |
| Alkaligenes faecalis | .4 | .09 | .09 | .1 | .09 | .07 | .07 | .07 | .06 | .07 | .06 | .06 | .06 | .05 |
| Aspergillus niger | .04 | .02 | .03 | .03 | .03 | .02 | .02 | .02 | .02 | .02 | .02 | .02 | .02 | .02 |
| Bacillus cereus | .3 | .09 | .09 | .08 | .08 | .08 | .07 | .07 | .07 | .06 | .06 | .07 | .06 | .05 |
| Bacillus megatherium | .2 | .08 | .08 | .09 | .07 | .08 | .08 | .07 | .07 | .07 | .06 | .07 | .06 | .05 |
| Bacillus mesentericus | .3 | .08 | .07 | .07 | .08 | .07 | .07 | .07 | .07 | .07 | .06 | .06 | .06 | .06 |
| Bacillus subtilis | .4 | .08 | .08 | .07 | .06 | .06 | .06 | .05 | .05 | .05 | .06 | .05 | .05 | .05 |
| Escherichia coli | .3 | .08 | .08 | .06 | .07 | .06 | .05 | .05 | .05 | .07 | .06 | .05 | .05 | .05 |
| Lactobacillus planetarius | .11 | .10 | .09 | .08 | .09 | .07 | .06 | .05 | .06 | .08 | .05 | .06 | .05 | .05 |
| Penicillium digitatum | .03 | .02 | .03 | .03 | .02 | .01 | .01 | .01 | .01 | .01 | .01 | .01 | .01 | .01 |
| Penicillium expansum | .01 | .01 | .01 | .01 | .01 | .01 | .005 | .005 | .005 | .005 | .005 | .005 | .005 | .005 |
| Pseudomonas aeruginosa | .4 | .085 | .10 | .09 | .09 | .08 | .08 | .08 | .07 | .09 | .06 | .06 | .05 | .05 |
| Rhisopus nigricans | .05 | .03 | .03 | .02 | .02 | .03 | .03 | .02 | .02 | .03 | .02 | .02 | .02 | .02 |
| Saccharomyces cerevisiae | .1 | .05 | .05 | .05 | .06 | .06 | .06 | .05 | .07 | .07 | .05 | .04 | .04 | .05 |
| Salmonella pullorum | .3 | .1 | .1 | .09 | .06 | .08 | .08 | .09 | .07 | .07 | .08 | .06 | .05 | .05 |
| Staphylococcus aureus | .3 | .08 | .09 | .09 | .08 | .08 | .07 | .08 | .09 | .07 | .06 | .06 | .06 | .05 |
| Streptococcus pyogenes | .3 | .09 | .09 | .08 | .09 | .08 | .09 | .09 | .08 | .06 | .06 | .06 | .06 | .06 |
| Trichophyton mentagrophytes | .005 | .004 | .003 | .003 | .003 | .003 | .003 | .002 | .002 | .002 | .002 | .002 | .002 | .002 |
| Trichophytonein terdigitalis | .005 | .004 | .004 | .003 | .003 | .003 | .003 | .003 | .002 | .002 | .002 | .002 | .002 | .002 |

[1] Test period: 7 days for yeast and bacteria, 2 weeks for fungi.

From the results given on table 2 it follows that any of the materials identified as $A_1$ till $A_{13}$ is superior to a high degree over dehydroacetic acid alone and even for the most resistant microorganisms the required minimum concentration inhibiting growth is below .1%. This is a highly desirable result, allowing the preservative compositions to be used sparingly in food preservation. Practical application for food and beverage preservation of compounds made according to the present invention have shown that the necessary amount was even much lower than .1%, and under same conditions at least half as much as with dehydroacetic acid or its edible salts alone.

Table 3 gives further evidence and examples of the preserving qualities of some of the activated compounds of dehydroacetic acid in accordance with this invention, applied to different beverages and foodstuffs either when incorporated directly into the food or applied as a wash, spray or dip, or when incorporated into the wrapper. These tests have been conducted upon the same samples of the beverages and foodstuffs, applying the same conditions of time, temperature and humidity. The indicated amounts of the preservative compounds are minimum quantities necessary to prevent spoilage from the inherent microorganisms in the particular beverage or foodstuff.

In Table No. 3, where the preservative is incorporated in a wrapping or container, the percentage given indicates the concentration with respect to the weight of the wrapper. In view of the fact that the weight of the wrapper is normally only a fraction of the weight of the food, even in the unlikely event of a complete transfer of preservative to food, the concentration in the food will be substantially below .1%.

Furthermore, in Table No. 3, where a wash, dip or spray is used, the figures given indicate the concentration of the preservative in the solution used as the wash, dip or spray.

TABLE 3

| Tested Beverage or Foodstuff | Mode of Application | Necessary Minimum Concentration in Weight Percent | | | |
|---|---|---|---|---|---|
| | | $A_0$ | $A_2$ | $A_6$ | $A_{10}$ |
| 1. Beer | Dissolved | .05 | .03 | .02 | Not applied. |
| 2. Wine | do | .07–.1 | .04–.06 | .04–.05 | Do. |
| 3. Apple juice | do | .03–.5 | .02–.04 | .02–.03 | Do. |
| 4. Orange juice | do | .02–.5 | .01–.02 | .01–.02 | Do. |
| 5. Corn syrup | do | .03–.5 | .01–.02 | .01–.02 | Do. |
| 6. Chocolade "hot fudge" syrup | do | .024–.5 | .01–.02 | .01–.015 | Do. |
| 7. Milk | Incorporated into the wall of the container paper board. | .1–.2 | .05–.1 | .03–.07 | Do. |
| 8. Whole bread | Added to the dough | .1–.2 | .05–.1 | .03–.07 | Do. |
| 8a. Whole bread | Incorporated into the bread wrapper, paper, glassine, cellophane. | .5–.2 | .3–.5 | .3–.4 | .2–.3. |
| 9. Gingerbread | Added to the dough | .075 | .05 | .04–.05 | Not applied. |
| 9a. Gingerbread | Incorporated into the wrapper, paper, glassine, cellophane. | .5–.2 | .3–.5 | .3–.4 | .2–.3. |
| 10. Cream cheese | Added to the cheese | .1 | .04–.06 | .03–.04 | Not Applied. |
| 10a. Cream cheese | Incorporated into the wrapper or container. | .5–1 | .2–.5 | .2–.4 | .2–.3. |
| 11. Frankfurters | Added to the meat | .2 | .1 | .05–.1 | Not Applied. |
| 11a. Frankfurters | Incorporated into the wrapper, paper, glassine, cellophane, or casing. | .5–1 | .2–.3 | .2–.3 | .1–.2. |
| 12. Smoked meat, bacon, ham | Dipped or sprayed conc. of the solution, weight percent. | .1–.2 | .04–.05 | .04–.05 | .03–.05. |
| 12a. Smoked meat, bacon, ham | Incorporated into the wrapper, i. e. paper, casing, glassine, cellophane, plastic coating. | .5 | .2–.3 | .2–.25 | .15–.2. |
| 13. Edible fat, butter, lard, margarine, shortening, mayonaise. | Incorporated into the fat | .05 | .02–.03 | .015–.025 | Not Applied. |
| 13a. Edible fat, butter, lard, margarine, shortening, mayonaise. | Incorporated into the wrapper, i. e. paper, glassine, etc. | .5 | .2–.3 | .20 | .15–.20. |
| 14. Tobacco, chewing tobacco, cigarettes, cigars, etc. | Incorporated into the wrapper. | .5 | .2–.3 | .2–.3 | .1–.2. |
| 14a. Tobacco, chewing tobacco, cigarettes, cigars, etc. | Sprayed | .4 | .2–.3 | .1–.2 | .1–.2. |
| 15. Dried fruits | Sprayed Conc of the solution | .1–.3 | .05–.06 | .05–.06 | .04–.05. |
| 15a. Dried fruits | Incorporated into the wrapper, i. e. paper, cartonboard, boxes, etc. | .5 | .2–.3 | .2–.3 | .1–.2. |
| 16. Fresh berries, strawberries, raspberries, blackberries, cherries, grapes, etc. | Washed. Conc | .1 | .05 | .05 | .04–.05. |
| 16a. Fresh berries, strawberries, raspberries, blackberries, cherries, grapes, etc. | Incorporated into the packaging (Paper, boxes, etc.) | .5 | .2–.3 | .2–.3 | .1–.2. |
| 17. Citrus fruits, apples, pears, avocados, etc. | Washed, dipped or sprayed, Conc. of the solution in wt. percent. | .2 | .1 | .1 | .1. |
| 17a. Citrus fruits, apples, pears, avocados, etc. | Incorporated into the wrapper, paper, cellophane, linings, etc. | .5 | .2–.3 | .2–.3 | .1–.2. |
| 18. Cantaloupes, melons, bananas, tomatoes | Washed, sprayed, dipped, conc. of the solution. | .1 | .05 | .05 | .05. |
| 18a. Cantaloupes, melons, bananas, tomatoes | Incorporated into the wrapper, Paper, cellophane, liner, etc. | .5 | .2–.3 | .2–.3 | .1–.2. |
| 19. Vegetables, cucumbers, potatoes, carrots, beets, etc. | Washed, sprayed, dipped, Conc. of the solution in wt. percent. | .2 | .1 | .1 | .1. |
| 19a. Vegetables, cucumbers, potatoes, carrots, beets, etc. | Incorporated into the wrapper, Paper, lining, bags, boxes, etc. | .5 | .2–.3 | .2–.3 | .1–.2. |
| 20. Chocolate filled candies, etc. | Incorporated into the wrapper, paper, cellophane, foil, etc. | .5 | .2–.3 | .2–.3 | .1–.2. |

While, for the purpose of illustration, the present invention is described in detail in connection with foodstuffs and other edible substances, it is also applicable where it is desired to inhibit, in a manner non-toxic and non-irritating to humans and warm blooded animals, microorganisms in articles or substances, as for example, cosmetics, lotions, ointments, handkerchiefs, towels, napkins, bandages, dressings, absorbent cotton, etc.

I claim:

1. A composition of matter for inhibiting microorganisms, comprising as preserving agent a mixture of 83% to 50% by weight of a dehydroacetic acid compound selected from the group consisting of dehydroacetic acid and its edible salts with 17% to 50% by weight of a synergist consisting of a benzoic acid compound selected from the group consisting of benzoic acid and its edible derivatives.

2. A composition as claimed in claim 1, in which the synergist is benzoic acid.

3. A composition as claimed in claim 1, in which the synergist is n-butylparahydroxybenzoate.

4. A composition as claimed in claim 1, in which the synergist is propylparahydroxybenzoate.

5. A composition as claimed in claim 1, in which the synergist is ethylparahydroxybenzoate.

6. A composition as claimed in claim 1, in which the synergist is sodium propylparahydroxybenzoate.

7. A method of inhibiting microorganisms in a substance which supports microorganic growth, comprising incorporating in said substance a preserving agent consisting of a mixture of 83% to 50% by weight of a dehydroacetic acid compound selected from the group consisting of dehydroacetic acid and its edible salts, with 17% to 50% by weight of a synergist consisting of a benzoic acid compound selected from the group consisting of benzoic acid and its edible derivatives, said preserving agent being incorporated in said substance in an amount not exceeding 0.5% based on the weight of said substance.

References Cited in the file of this patent

UNITED STATES PATENTS

| | | |
|---|---|---|
| 1,627,342 | Sabalitschka | May 3, 1927 |
| 1,715,251 | Sabalitschka et al. | May 28, 1929 |
| 2,474,228 | Coleman et al. | June 28, 1949 |
| 2,480,010 | Flett | Aug. 23, 1949 |